March 9, 1954     B. C. HAMILTON     2,671,263
EXTRACTOR TOOL FOR BEARING BUSHINGS
Filed July 17, 1950     2 Sheets-Sheet 1
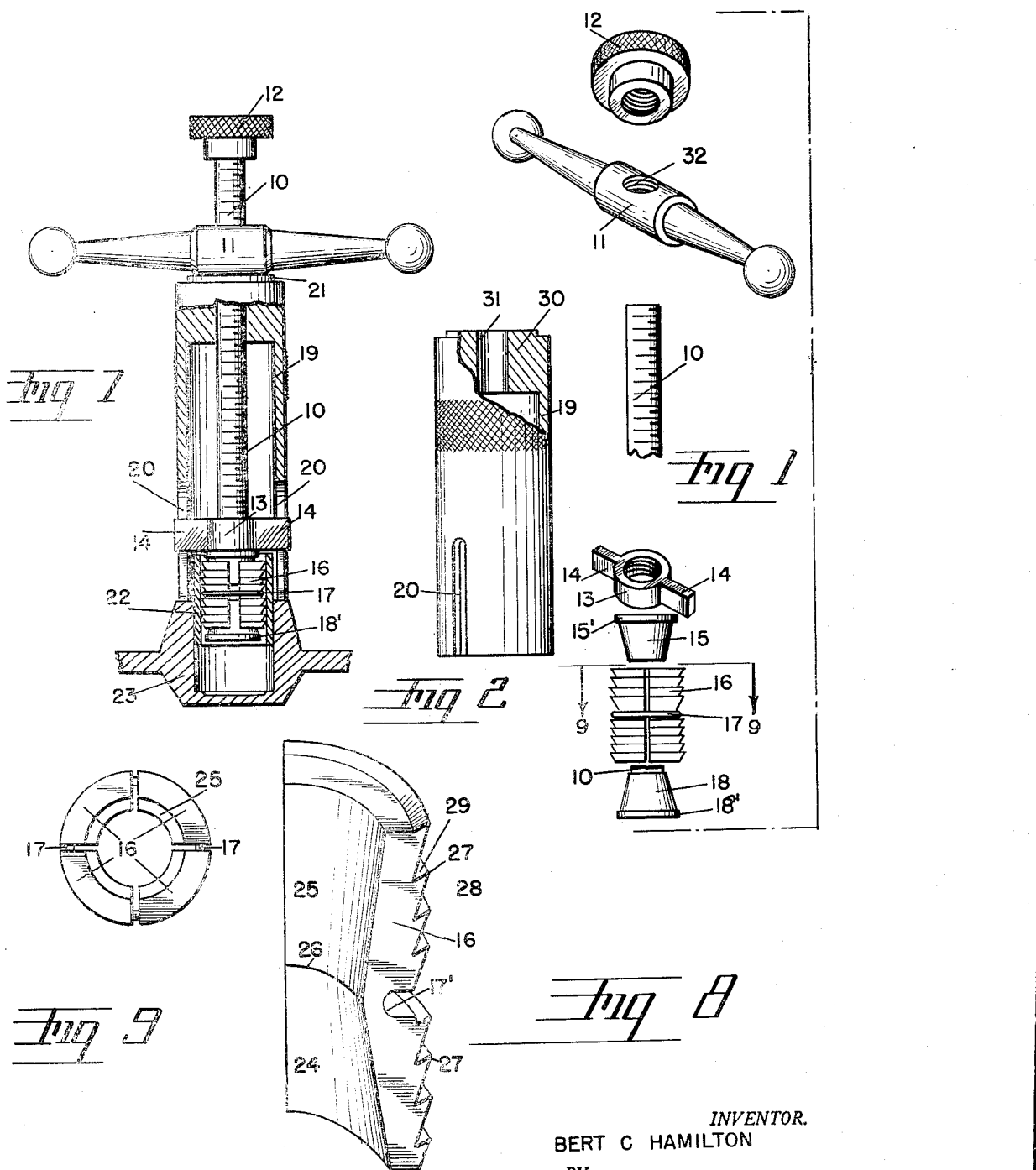
INVENTOR.
BERT C HAMILTON
BY
ATTORNEY

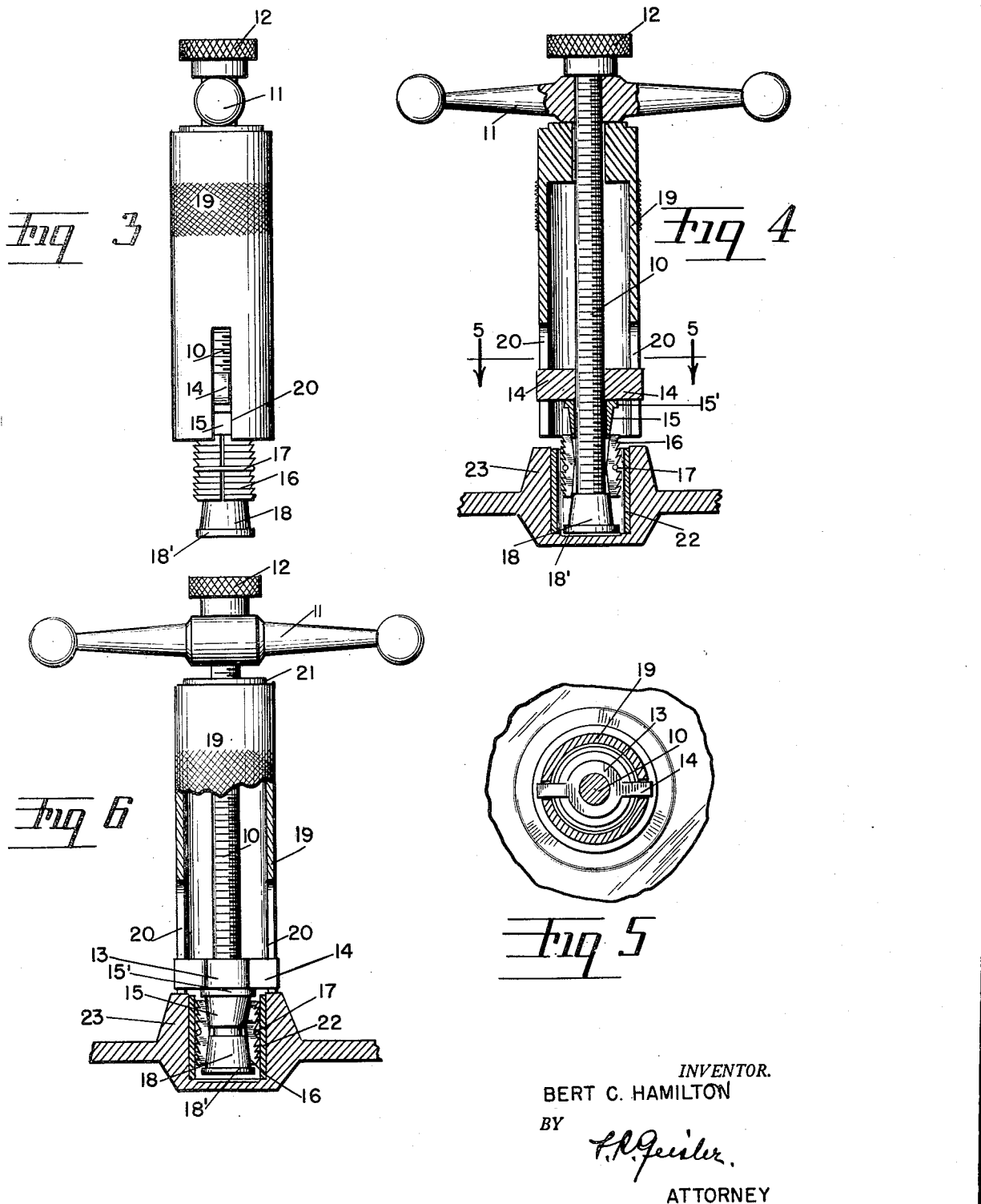

Patented Mar. 9, 1954

2,671,263

UNITED STATES PATENT OFFICE 2,671,263

EXTRACTOR TOOL FOR BEARING BUSHINGS

Bert C. Hamilton, La Grande, Oreg.

Application July 17, 1950, Serial No. 174,270

2 Claims. (Cl. 29—265)

This invention relates to the removal of bushings from bearings or housings, and, in particular, to the removal of either tubular or split bushings from bearings or housings which are closed at one end so that the bushing must be pulled out of the bearing or housing in order to be removed.

The present application is a continuation in part of my application, Serial No. 39,312, filed under date of July 17, 1948, and entitled "Tubular Bushing Remover and Replacer" now abandoned.

The object of the present invention is to provide a practical and improved tool by means of which a bushing can be pulled out of a bearing or housing, particularly out of a closed end bearing of the type above indicated, easily and quickly without any possibility of damage to the bearing, and without requiring any special skill on the part of the person using the bushing extractor.

The manner in which my improved tool or bushing extractor is constructed and the manner in which the same is operated will be readily understood from the following brief description with reference to the accompanying drawings.

In the accompanying drawings:

Fig. 1 is an exploded view showing the various members which are mounted on the main shaft of the tool in their relative arrangement, the major portion of the main shaft shown broken away for the sake of clarity;

Fig. 2 is a side elevation, partly in section, of the cooperating cylindrical shell within which the removal of the bushing takes place;

Fig. 3 is a side elevation of the entire tool;

Fig. 4 is a sectional elevation of the entire tool, the tool being turned 90° from the position in Fig. 3, and the tool being shown inserted in a bearing or housing preparatory to the removal of the bushing therefrom, the bearing and bushing similarly being shown in sectional elevation;

Fig. 5 is a sectional plan on the line 5—5 of Fig. 4;

Fig. 6 is an elevation, partly in section, of the entire tool and a sectional elevation of the bearing and bushing, similar to Fig. 4 but showing the tool in engagement with the bushing and set for pulling the bushing from the bearing;

Fig. 7 is a sectional elevation similar to Fig. 6 but showing the operation and position of the elements of the tool during the pulling of the bushing from the bearing or housing;

Fig. 8 is an enlarged perspective view of one of the jaw segments by means of which a gripping hold on the bushing is obtained by the tool; and Fig. 9 is a top plan view of the jaw segments arranged in their relative position with respect to each other, this view also corresponding to a plan view taken on line 9—9 of Fig. 1 but drawn to a larger scale.

Referring first to Figs. 1, 4, 6, and 7, my bushing extractor or puller includes a main shaft or rod 10 which is threaded preferably for substantially its entire length and which is of uniform diameter throughout its extent except at its lower end. At the lower end the rod 10 has a frusto-conical portion 18 of increasing diameter which terminates in a bottom annular flange or shoulder 18'. The peripheral diameter of the bottom shoulder 18' is, however, considerably less than the internal diameter of the bushings to be removed, as apparent from Figs. 4 and 6 in which the reference character 22 indicates the bushing to be removed, the bushing being located in the bearing 23. A sleeve 15 (Figs. 1, 4 and 6) is slidable on the rod 10. This sleeve 15 is formed with a frusto-conical surface substantially identical to that of lower portion 18 of the rod but sloping in opposite direction, and the sleeve 15 terminates at the top in an annular flange or shoulder 15' of the same peripheral diameter as the annular shoulder 18' at the bottom end of the rod 10.

A plurality of identical jaw segments 16 encompass the portion of the rod 10 between the sleeve 15 and the lower portion 18. In the construction illustrated in the drawings there are four such jaw segments (see Fig. 9), and thus each jaw segment extends approximately 90° around the rod. The jaw segments are held together by a spring ring 17 (Figs. 1 and 3), which spring ring is supported in a groove 17' (Fig. 8) extending around the central portion of each jaw segment.

The inner surface of each jaw segment (Fig. 8) is formed with two faces 24 and 25 constituting parts of the frusto-conical surfaces which slope oppositely and the slopes of which correspond respectively to the frusto-conical surfaces of the lower portion 18 of the rod 10 and the slidable sleeve 15 previously described. These two sloping faces 24 and 25 slope downwardly and outwardly and upwardly and outwardly repectively from a central transverse ridge line 26 (Fig. 8), the diameter of the curvature of which corresponds to the diameter of the rod 10.

The outer face of each jaw segment 16 has the overall shape of a cylindrical section, but the surface is formed with a series of parallel, transversely-extending ridges 27, above and below the center transverse groove 17'. These ridges 27 constitute gripping teeth of special formation and are an important feature of the jaw segments. Each ridge or tooth 27 has a lower face 28, sloping upwardly and outwardly and a top face 29 which has a very slight upward slope. The function of these teeth 27 will be apparent presently.

A sleeve-engaging nut 13 (Figs. 1 and 6) is mounted on the rod 10 above the sleeve 15. This nut 13 is formed with a pair of oppositely-extending arms or wings 14, 14.

A cylindrical body or shell 19 (Figs. 2, 3 and 4) which constitutes part of the complete tool, has a head portion 30 through which an axial channel 31 extends. The bottom of the cylindrical shell 31 is open. The diameter of the channel 31 is slightly greater than that of the rod 10 so that the rod 10 may slide freely in the channel 31. The interior diameter of the cylindrical shell 19, as shown in Figs. 6 and 7, is somewhat greater than the diameter of the bearing 23 and thus somewhat greater than the exterior diameter of the bushing 22 to be removed. The lower portion of the cylindrical shell 19 has two diametrically opposite slots 20 (Figs. 2, 3 and 4) parallel to the axis of the cylindrical shell and extending to the lower end of the shell. The width of these slots 20 is slightly greater than the thickness of the arms or wings 14, 14 of the nut 13, so that these wings which are long enough to extend through the slots in the cylindrical shell when the rod 10 extends through the shell, can slide up or down in the slots 20.

An operating arm 11 (Fig. 1) has a central threaded channel 32, the threads of which are adapted for engagement with the threaded surface of the rod 10 so that the operating arm 11 can be screwed on the rod 10.

A cap 12 (Fig. 1) is adapted to be screwed or otherwise secured tightly on the top end of the rod 10. Preferably, the periphery of the cap 12 is knurled in order to provide an easy finger grip for the cap. Thus when the cap is in place on the rod 10 the rod can be manually turned through the medium of the cap by slight movement of the fingers of the operator.

The entire tool is assembled as follows: The jaw segments 16, held together by their common spring ring 17, are first slid on the rod 10 from the top end of the rod and are pushed down on the rod until they come into contact with the enlarged lower portion 18 of the rod. Since the jaw segments are normally held close together by their spring ring 17 they will not slide to any extent down over the enlarged portion 18 of the rod 10 until forced to do so. Next, the sleeve 15 is slid on the rod 10 and drops down into contact with the upper ends of the jaw segments 16. The sleeve-engaging and adjusting nut 13 is then set on the rod and screwed down until it is in close proximity to the sleeve 15. Next the cylindrical shell 19 is slipped over the rod 10 so that its two slots 20, 20 will engage the wings 14, 14 of the nut 13. After the cylindrical shell 19 has been placed on the rod 10 in this manner, operating arm 11 is screwed down on the top end of the rod extending above the top of the cylindrical shell. Finally the cap 12 is screwed or otherwise secured firmly in place on the top end of the rod 10. The entire assembled tool will then appear as illustrated in Fig. 3.

The operation of the tool in the extracting or pulling of a bushing from a bearing will be readily understood from Figs. 4, 6 and 7. With the various members of the tool in approximately the relative position shown in Fig. 4, the bottom end and lower portion of the rod 10 is inserted in the bushing 23 to be removed. Since the jaw segments 16 are held in retracted position by their spring 17, the lower portion of the rod 10 with the jaw segments can readily be inserted in the bushing 22 as shown. The bottom end of the cylindrical shell 19 is held against the bearing 23 on the outside of the bushing. The operator then turns the cap 12, for example, in counterclockwise direction as viewed from the top of Fig. 4, so as to turn the rod 10 in the cylindrical shell 19, or, if preferred the operator can rotate the operating arm 11 counterclockwise. This will cause the operating arm 11 to contact the cap 12 whereupon continued rotation of the operating arm 11 in counterclockwise direction will turn the rod 10 in the same direction. At the same time the operator holds the cylindrical shell 19 against turning. The engagement of the wings 14, 14 of the nut 13 with the slots 20, 20 of the shell 19 prevents the nut 13 from turning with the rod 10 and consequently the rotation of the rod 10 counterclockwise causes the nut 13 to travel towards the lower end of the rod 10 pushing the sleeve 15 ahead of it. This movement of the sleeve 15 results in corresponding but modified movement in the same direction of the jaw segments 17 together with simultaneous movement in an outward or radial direction on the part of these jaw segments until the segments come into gripping contact with the inside surface of the bushing 16. The gripping jaws will then be in approximately the position illustrated in Fig. 6. As soon as the desired firm grip on the bushing is obtained by the jaws the operator discontinues the turning of the rod 10 and now rotates the operating arm 11 on the rod 10 in clockwise direction. The engagement of the jaw segments with the bushing 22 will hold the rod 10 against turning and consequently the turning of the operating arm 11 clockwise will cause the operating arm 11 first to engage the top of the cylindrical shell 19 and then to exert a pulling force on the rod 10. This pulling force on the rod 10 and corresponding thrust exerted against the bearing 23 through the cylindrical shell 19, will result in the pulling of the jaw segments 16 and the engaged bushing 22 out of the bearing 23 and into the end of the cylindrical shell 19 as illustrated in Fig. 7. The entire operation requires only a few minutes and also requires very little effort on the part of the operator. When the bushing is completely removed a few turns of the cap 12 and rod 10 in clockwise direction, while the arm 11 and cylindrical shell are held, will result in the loosening of the contact of the jaw segments with the bushing and thus permit the bushing to drop free from the tool while the jaw segments are returned to their normal retracted position.

Ordinarily, since the operator moves the jaws into gripping engagemnet with the bushing merely by turning the cap 12 or the arm 11 a few turns with the fingers there is not much likelihood of forcing the jaws radially outward too far. However, even if the operator should attempt to cause an unreasonable radial thrust to be exerted against the bushing and bearing in adjusting the gripping jaws, the engagement of the ends of the gripping jaws with the peripheral shoulders 18' and 15' respectively set a final limit beyond which the gripping jaws cannot expand. Since the inner surfaces of the jaw segments are tapered above and below the transverse center line to correspond to the taper of the frusto-conical surfaces of the sleeve 15 and lower end 18 of the rod respectively the outer surfaces of the segments will always determine a substantially cylindrical surface, the diameter of which will vary with the adjusting of the jaw segments.

The gripping teeth 27 of the jaw segments 16, due partly to the fact that they slope in the direction in which the pulling strain is exerted, enable a maximum grip to be obtained on the inside of the bushing by the jaw segments with only a minimum of outward radial thrust. In the case of split bushings particularly, where the radial thrust of the gripping jaws on the bushing would tend to increase the resistance offered by the bushing to its removal from the bearing, I have found that such gripping teeth on the jaws are most effective and facilitate the extracting of the bushing. Also since the amount of outward radial thrust required on the part of the gripping jaws is reduced, any possibility of injury to the bearing in the removal of old bushings is even further minimized.

I claim:

1. An extractor tool of the character described for removing a bushing from a bearing, said tool comprising a cylindrical shell open at one end and having a head at the opposite end, the internal diameter of said shell being slightly greater than the external diameter of the bushing to be removed and said shell adapted to have said open end set against the bearing for the bushing, a bushing-pulling rod considerably longer than said shell and extending axially through said shell, an axial channel in said head of said shell of sufficient diameter to allow said rod to slide freely therethrough and to be rotated with respect to said shell, said rod screw-threaded throughout its extent, a frusto-conical portion on the end of said rod beyond said open end of said shell, the maximum diameter of said frusto-conical portion being less than the internal diameter of the bushing to be removed, a plurality of identical jaw segments slidably mounted on said rod and having one end adapted to bear on said frusto-conical portion, spring means normally holding said jaw segments together in retracted position, the outer faces of said jaw segments forming parts of a cylindrical surface and having circular teeth extending in parallel planes, a sleeve slidable on said rod, said sleeve having a frusto-conical surface identical to that of said frusto-conical portion of said rod but sloping in opposite direction and adapted to engage the other ends of said jaw segments, a winged nut carried on said rod within said shell and adapted for engagement with the inner end of said sleeve, a pair of diametrically-opposite slots in said shell extending longitudinally inwardly from said open end, the wings of said nut extending radially outwardly through said slots respectively, the other end of said rod extending for some distance beyond said head of said shell, a cap secured on said other end, an operating screw-threaded handle bar on said rod between said head of said shell and said cap, whereby, when said frusto-conical end of said rod and said jaw segments are inserted in a bushing to be removed and said shell is held against the bushing bearing, the manual turning of said handle bar in one direction so as to bring said handle bar into engagement with said cap will then cause said rod to be rotated with said handle bar and said jaw segments to be expanded into gripping engagement with said bushing, whereupon the subsequent turning of said handle bar in the reverse direction will first bring said handle bar into engagement with said shell head and then produce axial movement of said rod to pull said bushing from said bearing, and whereby the final rotation of said rod in reverse direction by said cap will finally release said jaw segments from the extracted bushing.

2. An extractor tool of the character described for removing a bushing from a bearing, said tool comprising a cylindrical shell open at one end and having a head at the opposite end, the internal diameter of said shell being slightly greater than the external diameter of the bushing to be removed and said shell adapted to have said open end set against the bearing for the bushing, a bushing-pulling rod considerably longer than said shell and extending axially through said shell, an axial channel in said head of said shell of sufficient diameter to allow said rod to slide freely therethrough and to be rotated with respect to said shell, said rod screw-threaded throughout its extent, a frusto-conical portion on the end of said rod beyond said open end of said shell, said frusto-conical portion terminating in a peripheral shoulder having an outer diameter less than the internal diameter of the bushing to be removed, a plurality of identical jaw segments slidably mounted on said rod and having one end adapted to bear on said frusto-conical portion, spring means normally holding said jaw segments together in retracted position, the outer faces of said jaw segments forming parts of a cylindrical surface and having circular teeth extending in planes substantially perpendicular to the axis of said rod, the faces of said teeth on the side towards said frusto-conical portion sloping obliquely outwardly in a direction opposite to that of said frusto-conical portion, the other faces of said teeth sloping outwardly in a direction forming a greater acute angle with the axis of said rod, a sleeve slidable on said rod, said sleeve having a frusto-conical surface identical to that of said frusto-conical portion of said rod but sloping in opposite direction and adapted to engage the other ends of said jaw segments, said sleeve terminating at its inner end in said shell in a peripheral shoulder identical to said shoulder on said frusto-conical portion of said rod, a nut carried on said rod within said shell and adapted for engagement with the inner and shouldered end of said sleeve, a slot in said shell extending longitudinally inwardly from said open end, an arm on said nut extending radially outwardly through said slot, the other end of said rod extending for some distance beyond said head of said shell, a cap secured on said other end, finger grip means on the periphery of said cap to facilitate manual rotating of said rod by said cap, an operating, screw-threaded handle bar on said rod between said head of said shell and said cap, whereby, when said frusto-conical end of said rod and said jaw segments are inserted in a bushing to be removed and said shell is held against the bushing bearing, the manual turning of said handle bar in one direction so as to bring said handle bar into engagement with said cap will then cause said rod to be rotated with said handle bar and said jaw segments to be expanded into gripping engagement with said bushing, said shoulders on said sleeve and on said frusto-conical portion preventing excessive expansion of said jaw segments, whereupon the subsequent turning of said handle bar in the reverse direction will first bring said handle bar into engagement with said shell head and then produce axial movement of said rod to pull said bushing from said bearing, and whereby the final rotation of said rod in reverse direction by said cap will finally release said jaw segments from the extracted bushing.

BERT C. HAMILTON.

References Cited in the file of this patent

UNITED STATES PATENTS

| Number | Name | Date |
|---|---|---|
| 1,483,818 | Lloyd | Feb. 12, 1924 |
| 1,608,407 | Macias | Nov. 23, 1926 |
| 2,022,549 | Skelton | Nov. 26, 1935 |
| 2,031,998 | Bliss | Feb. 25, 1936 |
| 2,226,078 | Spahn | Dec. 24, 1940 |
| 2,246,954 | Schleinitz | June 24, 1941 |
| 2,257,318 | Wilborn | Sept. 30, 1941 |
| 2,320,435 | Hood | June 1, 1943 |
| 2,366,467 | Anderson | Jan. 2, 1945 |